(12) United States Patent
Rodgers et al.

(10) Patent No.: US 11,061,383 B1
(45) Date of Patent: Jul. 13, 2021

(54) DISPLAY CONTROL DEVICE

(71) Applicant: DMG MORI CO., LTD., Nara (JP)

(72) Inventors: Michael Rodgers, Houston, TX (US);
Munetaka Wakizaka, Nara (JP);
Kentaro Miyakawa, Hokkaido (JP)

(73) Assignee: DMG MORI CO., LTD.,
Yamatokoriyama (JP)

( * ) Notice: Subject to any disclaimer, the term of this patent is extended or adjusted under 35 U.S.C. 154(b) by 0 days.

(21) Appl. No.: 16/791,424

(22) Filed: Feb. 14, 2020

(51) Int. Cl.
*G05B 19/409* (2006.01)
*G06F 3/0488* (2013.01)
*G06F 3/0481* (2013.01)

(52) U.S. Cl.
CPC ....... *G05B 19/409* (2013.01); *G06F 3/04817* (2013.01); *G06F 3/04886* (2013.01); *G05B 2219/35488* (2013.01); *G06F 2203/04803* (2013.01)

(58) Field of Classification Search
CPC ....... G06F 2203/04803; G06F 3/04817; G06F 3/04886; G05B 19/409; G05B 2219/35488
See application file for complete search history.

(56) References Cited

U.S. PATENT DOCUMENTS

| | | | |
|---|---|---|---|
| 4,680,697 A | 7/1987 | Kiya et al. | |
| 5,984,503 A * | 11/1999 | Strickland | G05B 19/409 |
| | | | 318/569 |
| 2010/0194692 A1 * | 8/2010 | Orr | G06F 3/0416 |
| | | | 345/173 |
| 2015/0089389 A1 * | 3/2015 | Cohen-Zur | H04W 4/12 |
| | | | 715/752 |
| 2017/0168698 A1 | 6/2017 | Sakamoto et al. | |
| 2017/0300035 A1 * | 10/2017 | Kawai | G05B 19/4068 |
| 2019/0163168 A1 * | 5/2019 | Kitamura | G05B 19/414 |
| 2020/0310752 A1 * | 10/2020 | Lee | G06F 3/04817 |

FOREIGN PATENT DOCUMENTS

| | | |
|---|---|---|
| JP | S60-157608 A | 8/1985 |
| JP | 2009-193568 A | 8/2009 |
| JP | 2011-175456 A | 9/2011 |
| JP | 2013-200766 A | 10/2013 |
| JP | 2017-111516 A | 6/2017 |
| NO | 2016-051544 A1 | 4/2016 |

* cited by examiner

*Primary Examiner* — Muhammad N Edun

(74) *Attorney, Agent, or Firm* — IP Business Solutions, LLC

(57) ABSTRACT

A display control device includes a setting unit to set a mode selected by a user from a plurality of modes, and a display unit to display a machine operation panel and a keyboard on an operation screen of a machine operation panel. The modes include at least a machining mode for operating the machine tool to process a workpiece, and an MDI mode. When the mode is changed, the display unit displays a machine operation panel or a keyboard associated with the mode after the change on the operation screen.

7 Claims, 13 Drawing Sheets

FIG. 3

| GROUP | NC MODE | TYPE | POSITION |
|---|---|---|---|
| A | MEMORY DNC DIRECT | X1 | R |
| B | MDI | X2 | R |
| C | EDIT | X2 | R |
| D | JOG FF HOME | X1 | R |
| E | HANDLE | — | — |

140

X2  X2A

X2　　　　　　　　X2B

DISPLAY CONTROL DEVICE

BACKGROUND OF INVENTION

1. Field

The present invention relates to user interface technology for operating a machine tool.

2. Description of Related Diagrams

Machine tools include devices for cutting a workpiece into a desired shape, and devices for depositing metal powder or the like to make a workpiece. Examples of machine tools for cutting include a turning center that processes a workpiece by applying a cutting tool to the workpiece that is being turned, a machining center that processes a workpiece by applying a turning cutting tool to the workpiece, and a combined machine including these functions in combination.

A machine tool may provide a plurality of modes depending on control methods. Examples of such modes include a machining mode for reading a machining program provided in advance and processing a workpiece, an edit mode for creating and/or editing a machining program, and a manual data input (MDI) mode for writing simple commands or programs for execution at a work site (refer to Patent Literatures 1 and 2).

RELATED ART DIAGRAM

Patent Literature 1: JP 2017-111516 A
Patent Literature 2: JP 2013-200766 A

In processing of workpieces, in particular, in processing of a large quantity of workpieces for mass production using one machining program, it is important to increase the operating rate of a machine tool as much as possible. A machine tool used for such processing for mass production has limited functions and is therefore compact with a small installation area for a console.

Under such circumstances, there have been demands for improving user-friendliness of machine tool consoles.

SUMMARY OF INVENTION

A display control device according to an embodiment of the present invention includes: a display unit to display a machine operation panel and a keyboard on an operation screen of a machine operation panel; and a setting unit to set a mode selected by a user from a plurality of modes of the machine tool.

The modes include at least a machining mode for operating the machine tool to process a workpiece, and an MDI mode.

When the mode is changed, the display unit displays a machine operation panel or a keyboard associated with the mode after the change on the operation screen.

A display control device according to another embodiment of the present invention includes: a display unit to display a machine operation panel and a keyboard on an operation screen of a machine operation panel; and a setting unit to set a mode selected by a user from a plurality of modes of the machine tool.

When a first mode of the modes is selected, the display unit displays first information associated with the first mode on the operation screen, when a second mode of the modes is selected, the display unit displays second information associated with the second mode on the operation screen, and when the first mode is selected while the second information in the second mode is displayed, the display unit displays the first information in such a manner that the display unit displays a machine operation panel or a keyboard associated with the first mode after the change on the operation screen on a condition that a group to which the first mode belongs and a group to which the second mode belongs are different from each other.

BRIEF DESCRIPTION OF DRAWINGS

FIG. 3 is a data structure table of panel setting information;

DETAILED DESCRIPTION

Figure 1:
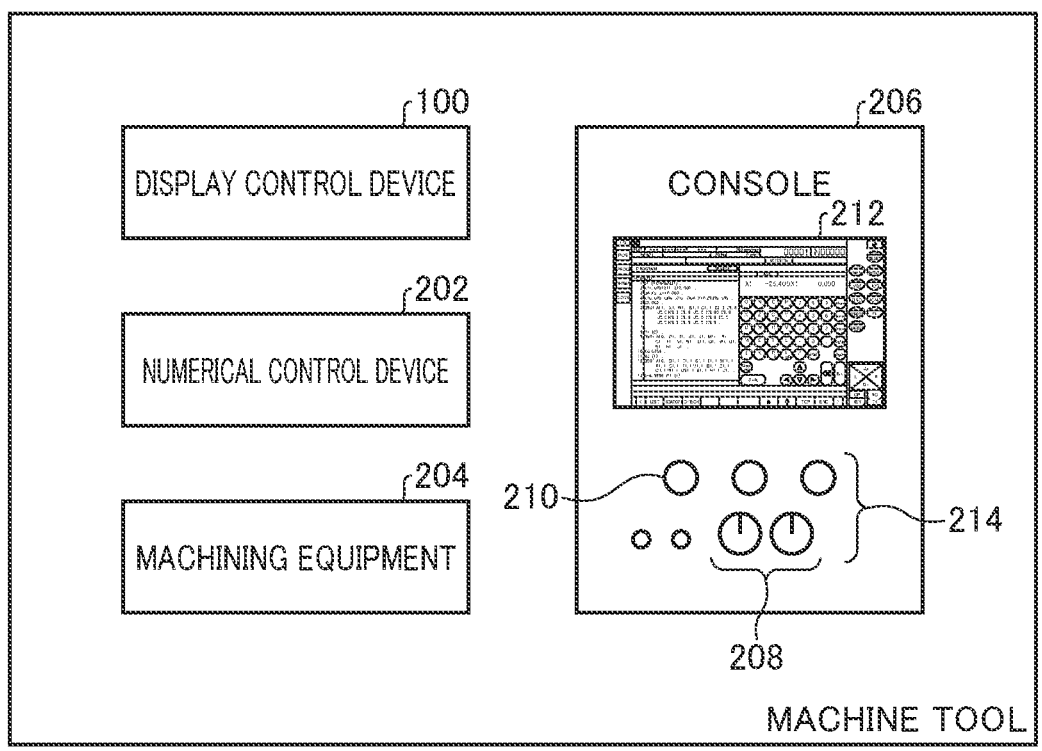
FIG. 1 is a hardware configuration diagram of a machining system.

FIG. 1 is a hardware configuration diagram of a machine tool 200.

The machine tool 200 includes a console 206, a display control device 100, a numerical control device 202, and machining equipment 204. The numerical control device 202 transmits control signals to the machining equipment 204 in accordance with a machining program. The machining equipment 204 processes workpieces in accordance with instructions from the numerical control device 202. The machining equipment 204 in the present embodiment includes two turrets, and is capable of individually processing two workpieces at the same time. The numerical control device 202 also receives position information on cutting tools from the machining equipment 204.

The console 206 includes a monitor 212 that displays various information data for users and receives touch operations and a physical operation device (hereinafter referred to as a "hardware device 214"). An operation device operated with a touch panel of the monitor 212 will be referred to as a "software device". The hardware device 214 includes a stop button 210 for urgently stopping the machining equipment 204, a handle 208 for manually operating a spindle of the machining equipment 204, and the like.

The display control device 100 is a system that implements user interface functions on the console 206. The display control device 100 detects various operational inputs to the monitor 212, and generates screen information to be displayed on the monitor 212. The display control device 100 may be formed as part of functions of the console 206 or may be formed as functions of an external device (such as a tablet computer) of the console 206.

Figure 2:
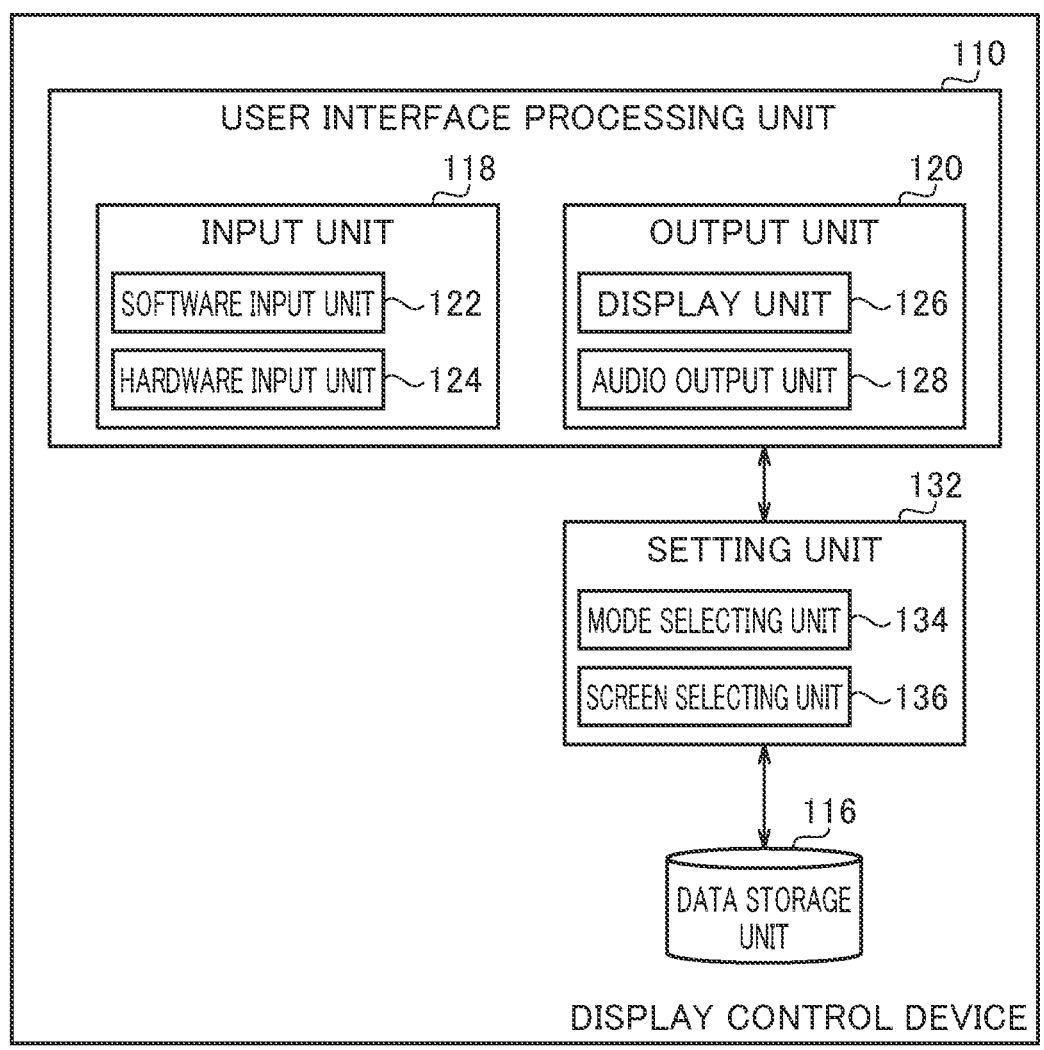
FIG. 2 is a functional block diagram of a display control device.

FIG. 2 is a functional block diagram of the display control device 100.

Components of the display control device 100 are implemented by arithmetic units such as central processing units (CPUs) and various computing processors, storage devices such as memories and storages, hardware including wire or wireless communication lines connecting the components, and software stored in the storage devices to provide processing instructions to the arithmetic units. Computer programs may be constituted by device drivers, Operating Systems, various application programs on upper layers thereof, and libraries providing common functions to the programs. Blocks described below do not represent components in hardware units but represent blocks in functional units.

The display control device 100 includes a user interface processing unit 110, a setting unit 132, and a data storage unit 116.

The user interface processing unit 110 receives operations made by users via a software device or the hardware device 214, and also performs processing relating to user interfaces such as image display and audio output. The setting unit 132 performs various processes on the basis of data acquired by the user interface processing unit 110 and data stored in the data storage unit 116. The setting unit 132 also functions as an interface between the user interface processing unit 110 and the data storage unit 116. The data storage unit 116 stores various programs and set data.

The user interface processing unit 110 includes an input unit 118 and an output unit 120.

The input unit 118 receives inputs made by users. The input unit 118 includes a software input unit 122 that receives inputs made by users via a software device, and a hardware input unit 124 that receives inputs made by users via a hardware device. The output unit 120 includes a display unit 126 that displays images and the like on screens, and an audio output unit 128 that outputs audio such as a buzzer sound. The display unit 126 displays panels (keyboards and machine operation panels), which will be described later, on screens.

The setting unit 132 performs various settings for operating the display control device 100. The setting unit 132 includes a mode selecting unit 134 and a screen selecting unit 136. The mode selecting unit 134 selects a mode in accordance with an instruction from a user. The screen selecting unit 136 selects an active screen in accordance with an instruction from a user. Modes and active screens will be described later.

FIG. 3 is a data structure table of panel setting information 140.

The panel setting information 140 is stored in the data storage unit 116. The panel setting information 140 is a data table that defines modes, groups, types and display positions of panels to be displayed at selection of a mode (hereinafter referred to as an "initial setting pattern"). The display control device 100 in the present embodiment includes nine modes, which are memory, direct numerical control (DNC), direct, MDI, edit, jog, fast forward (FF), return to origin (home), and handle. The modes in the present embodiment are NC modes of the numerical control device 202. The numerical control device 202 having received an input from each NC mode screen transmits a control signal for moving a motor of a spindle and/or a table in the machining equipment 204. The nine modes in the present embodiment are classified into five groups A to E.

Outlines of modes in each of the groups are as follows.

<Group A>

(1) Memory

The machining equipment 204 is controlled in accordance with a machining program stored in the data storage unit 116, to process a workpiece.

(2) DNC

The machining equipment 204 is controlled in accordance with a machining program being received via communication lines from an external terminal such as a personal computer storing the machining program, to process a workpiece.

(3) Direct

The machining equipment 204 is controlled on the basis of interactive data generated by interactive programming, to process a workpiece. In interactive programming, a movement path or the like of a cutting tool of the machining equipment 204 is defined through input operations at a graphical user interface (GUI) provided in advance.

<Group B>

(4) MDI

A simple program is created at the display control device 100, and the machining equipment 204 is controlled in accordance with the program. A program to be created in the MDI mode is assumed to be a simple test program. Hereinafter, a program created in the MDI mode will be particularly referred to as an "MDI program".

<Group C>

(5) Edit

A machining program is edited. In addition, a machining program is created or modified.

<Group D>

(6) Jog

A spindle or the like of the machining equipment 204 is operated at a normal speed through a machine operation panel X1 (to be described later) displayed on an operation screen.

(7) Fast Forward

A spindle or the like of the machining equipment 204 is manually operated in a manner similar to the jog mode but at a speed higher than that in the jog mode.

(8) Home A spindle or the like of the machining equipment 204 is returned to its home position.

<Group E>

(9) Handle

A spindle or the like of the machining equipment 204 is manually operated by the handle 208 (hardware device) instead of an operation screen.

In the present embodiment, the modes are classified into the five groups depending on commonality of use cases between respective modes. The number of groups and association between a mode and a group can be freely set by a designer or a user of the display control device 100.

When a user has changed the mode, the display unit 126 determines a panel type to be displayed on the basis of the panel setting information 140. Alternatively, the display position of the panel may also be determined when the mode is changed. The panel setting information 140 may associate a panel type with each mode, or may associate a panel type with each group. In the present embodiment, a method of panel display is defined for each group, which can include a plurality of modes.

For example, when any of the three modes (memory, DNC, and direct) belonging to the group A is selected, the display unit 126 initially displays the machine operation panel X1 in the right (R) of the screen. The machine operation panel X1 is a panel including an input interface for manually operating mechanisms of the machining equipment 204 or an input interface for intervening in execution of a machining program (which will be described later with reference to FIG. 6, etc.).

When the MDI mode belonging to the group B is selected, the display unit 126 initially displays an NC keyboard X2 in the right (R) of the screen. The NC keyboard X2 is a panel for inputting characters and numbers (which will be described later with reference to FIG. 5, etc.).

When the handle mode belonging to the group E is selected, the display unit 126 displays neither of the machine operation panel X1 and the NC keyboard X2. An actual method for displaying the machine operation panel X1 and the NC keyboard X2 will be described in detail with reference to FIG. 5 and subsequent figures.

For example, in the edit mode (group C), the NC keyboard X2 is more likely to be used to modify a machining program than the machine operation panel X1 for controlling the machining equipment 204. When a user has selected the edit mode, the display unit 126 displays the NC keyboard X2. The user therefore need not make an additional operation to display the NC keyboard X2 on the screen after selecting the edit mode.

Similarly, in the memory mode (group A), the machining equipment 204 is controlled by a machining program. Thus, the machine operation panel X1 including the input interface for intervening in control of the machining equipment 204 is more likely to be used than the NC keyboard X2. When a user has selected the memory mode, the display unit 126 displays the machine operation panel X1. The user therefore need not make an additional operation to display the machine operation panel X1 on the screen after selecting the memory mode.

As a result of initially displaying a panel that is highly likely to be used in each mode or, more specifically, in each group to which the mode belongs after the mode is selected as described above, the number of operations made by a user is reduced.

Figure 4:
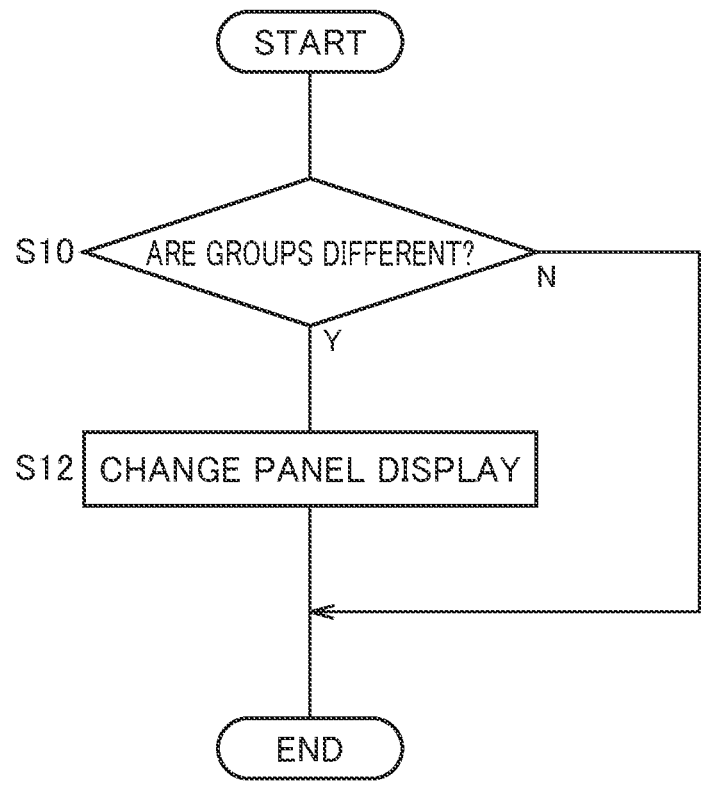
FIG. 4 is a flowchart illustrating processes performed when a mode is changed.

FIG. 4 is a flowchart illustrating processes performed when the mode is changed.

The mode selecting unit 134 determines whether the group to which the mode before the change belongs and that to which the mode after the change belongs are different from each other (S10). If the groups are different from each other (Y in S10), the display unit 126 changes the type and display position of the panel on the basis of the panel setting information 140 (S12). If the groups are the same (N in S10), the display unit 126 does not change the panel display.

If, however, the groups are different from each other but the display settings are the same, the display unit 126 need not change the type, etc. of the panel. For the panel, two types of panels, which are the machine operation panel X1 and a keyboard, can be used. For the keyboard, two types of keyboards, which are the NC keyboard X2 (keyboard for numerical control) and the CAL keyboard (keyboard for calculation) can be used. The CAL keyboard will be described later with reference to FIG. 12, etc.

The panel setting information 140 illustrated in FIG. 3 explains that the panel is displayed in the right (R) of the screen after the group is changed in every case. The display position of the panel is not limited thereto, and can be at any position such as on upper, lower, right, or left side of the screen. For example, for controlling a machining center, a plurality of initial display patterns may be provided as follows.

P1. No display
P2. The machine operation panel on the upper side as initial display
P3. The machine operation panel on the lower side as initial display
P4. The machine operation panel on the left side as initial display
P5. The machine operation panel on the right side as initial display
P6. The NC keyboard on the upper side as initial display
P7. The NC keyboard on the lower side as initial display
P8. The NC keyboard on the left side as initial display
P9. The NC keyboard on the right side as initial display
P10. The CAL keyboard (described later) on the upper side as initial display
P11. The CAL keyboard on the lower side as initial display
P12. The CAL keyboard on the left side as initial display
P13. The CAL keyboard on the right side as initial display The panel setting information 140 may set any one of the initial display patterns P1 to P13 in association with each group.

Alternatively, instead of association of one group with one or more modes and association of a display setting with each group, association of an initial display pattern with each mode may be employed.

In summary, when the mode is changed, the display unit 126 changes the panel display on the basis of the initial setting pattern of the mode after the change or the group associated with the mode after the change as appropriate. When the panel display is not different between before and after the change, the display unit 126 maintains the type and the position of the panel.

Hereinafter, changes of the operation screen based on various switchings between modes will be explained.

[Change from Edit Mode to Memory Mode]

Figure 5:
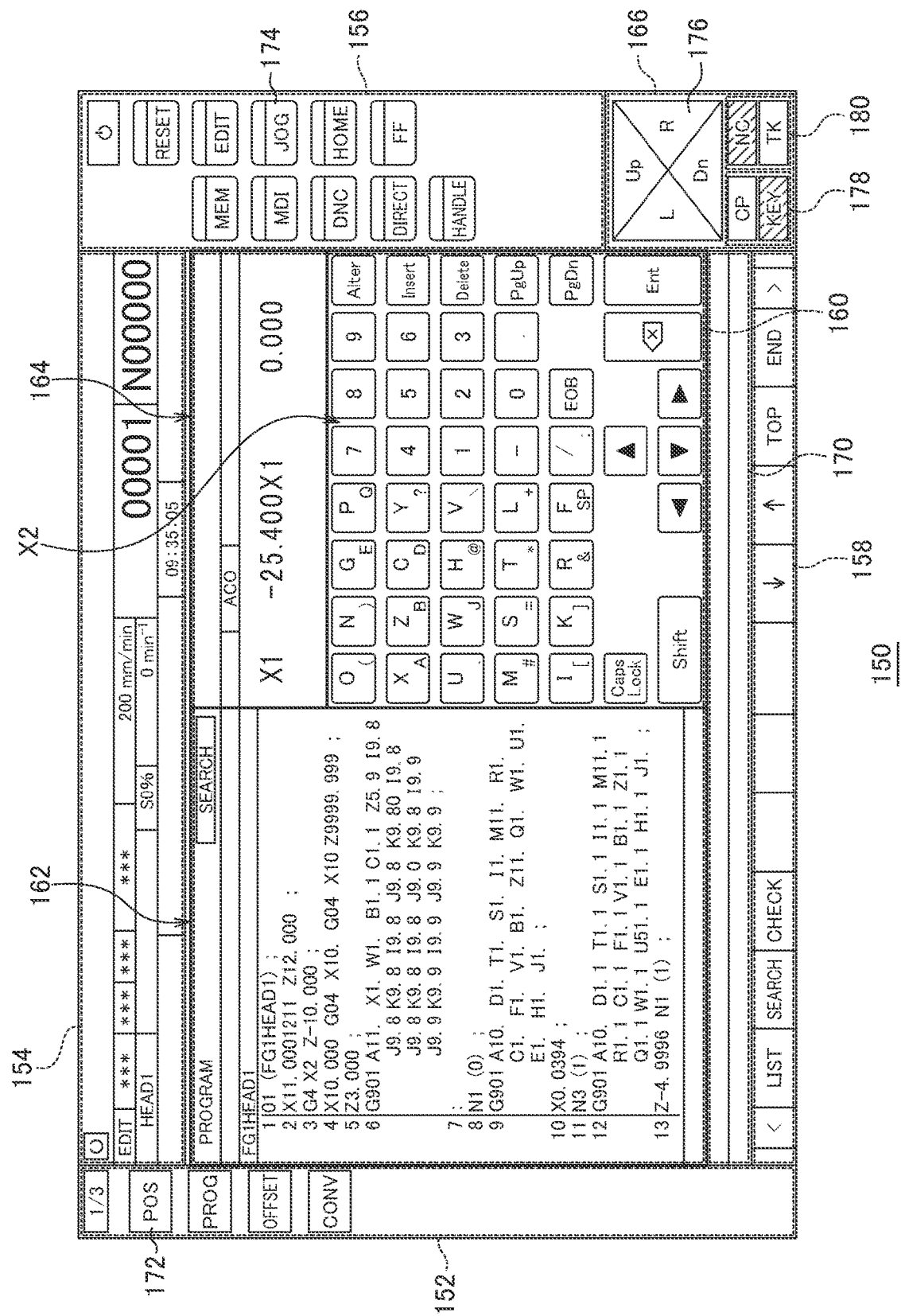
FIG. 5 is a diagram illustrating an operation screen when an edit mode is selected.

FIG. 5 is a diagram illustrating an operation screen 150 when the edit mode is selected.

The operation screen 150 is divided into seven areas, which are a central display area 160 at the center, a second selection button area 152, a state display area 154, a first button selection area 156, a message area 170, a soft key area 158, and a panel selection area 166.

The central display area 160 is further divided into a first area 162 and a second area 164. The first area 162 displays information associated with one of two turrets in the machining equipment 204, and the second area 164 displays information associated with the other of the two turrets in the machining equipment 204. The operation screen 150 enables users to recognize the operation states of cutting tools or the like at the two turrets in the machining equipment 204 at the same time. In FIG. 5, the NC keyboard X2 is superimposed on the second area 164. Thus, part of information in the second area 164 is hidden by the NC keyboard X2.

The state display area 154 at an upper position displays various conditions of the machining equipment 204 such as a selected mode, the feed rate, the rotation speed, and the like of a cutting tool. The message area 170 at a lower position displays various messages. The soft key area 158 includes various soft key, such as "LIST" and "SEARCH", for setting the display positions and the like of the central display area 160. The second selection button area 152 displays a plurality of display selection buttons 172 for selecting an active screen (which will be described later). The first button selection area 156 displays a plurality of mode selection buttons 174 for selecting a mode. The panel selection area 166 is an input area for selecting the type and the position of a panel.

In the explanation of the present embodiment, assume that the following four types of screens are displayed in the second selection button area 152: "position (POS)", "program (PROG)", "offset (OFFSET)", and "conversation (CONV)".

(1) Position (POS)

The position screen provides position coordinates of a spindle. The position screen is the active screen in the second area 164 illustrated in FIG. 5.

(2) Program (PROG)

The program screen is a screen for creating, editing, and checking a machining program. The program screen is the active screen in the first area 162 illustrated in FIG. 5.

(3) Offset (OFFSET)

The offset screen is a screen for checking and registering the size of a cutting tool mounted in the machining equipment 204. In the offset screen, the wear degree of a cutting tool can also be checked. Note that a measuring tool, a camera-equipped tool, and the like can be registered as tool information on a tool registration information screen.

(4) Conversation (CONV)

The conversation screen is a screen for easily creating a machining program for machining a workpiece by using an interactive user interface.

A user selects either of the first area 162 and the second area 164 by touching the area, and switches the active screen in each area by using a display selection button 172. The same modes are applied for the two turrets. A user switches the mode by using a mode selection button 174. In FIG. 5, the edit mode is selected.

In FIG. 5, the NC keyboard X2 is superimposed on the second area 164. A user can change the display position of the NC keyboard X2 to an upper, lower, right or left position by selecting a panel position button 176 in the panel selection area 166. In FIG. 5, right (R) is selected. Thus, the NC keyboard X2 is displayed on the right side in the central display area 160 (predetermined position).

The panel type can be changed with use of panel type buttons 178 in the panel selection area 166. When a control panel (CP) button is selected, the display unit 126 deletes the NC keyboard X2, and displays the machine operation panel X1. When a KEY button is selected thereafter, the display unit 126 deletes the machine operation panel X1, and displays the NC keyboard X2 again. In FIG. 5, the KEY button and an NC button are selected, and the NC keyboard X2 is thus displayed. When the CP button and the KEY button are not selected, the display unit 126 displays neither of the panels in the central display area 160.

When the KEY button is selected and the NC keyboard X2 is displayed, a user can further select a size change button 180 (the NC button or a TK button). When the NC button is selected, the NC keyboard X2 that is relatively large in size including numbers and characters is displayed as illustrated in FIG. 5. When the TK button is selected, the CAL keyboard that is reduced in size is selected. The CAL keyboard will be described later in detail with reference to FIGS. 12 and 13.

The display unit 126 displays a panel within the central display area 160 in such a manner that the panel does not protrude out of the central display area 160. In other words, the panel is displayed in such a manner that the panel does not overlap with the state display area 154, the second selection button area 152, the first button selection area 156, the panel selection area 166, the soft key area 158, and the message area 170. When a user has selected a right button (R) in the panel selection area 166, the panel is displayed at a predetermined position on the right side in the central display area 160. When a user has selected an up button (Up), the panel is displayed at a predetermined position on an upper side in the central display area 160. This applies similarly to a left button (L) and a down button (Dn).

Figure 6:
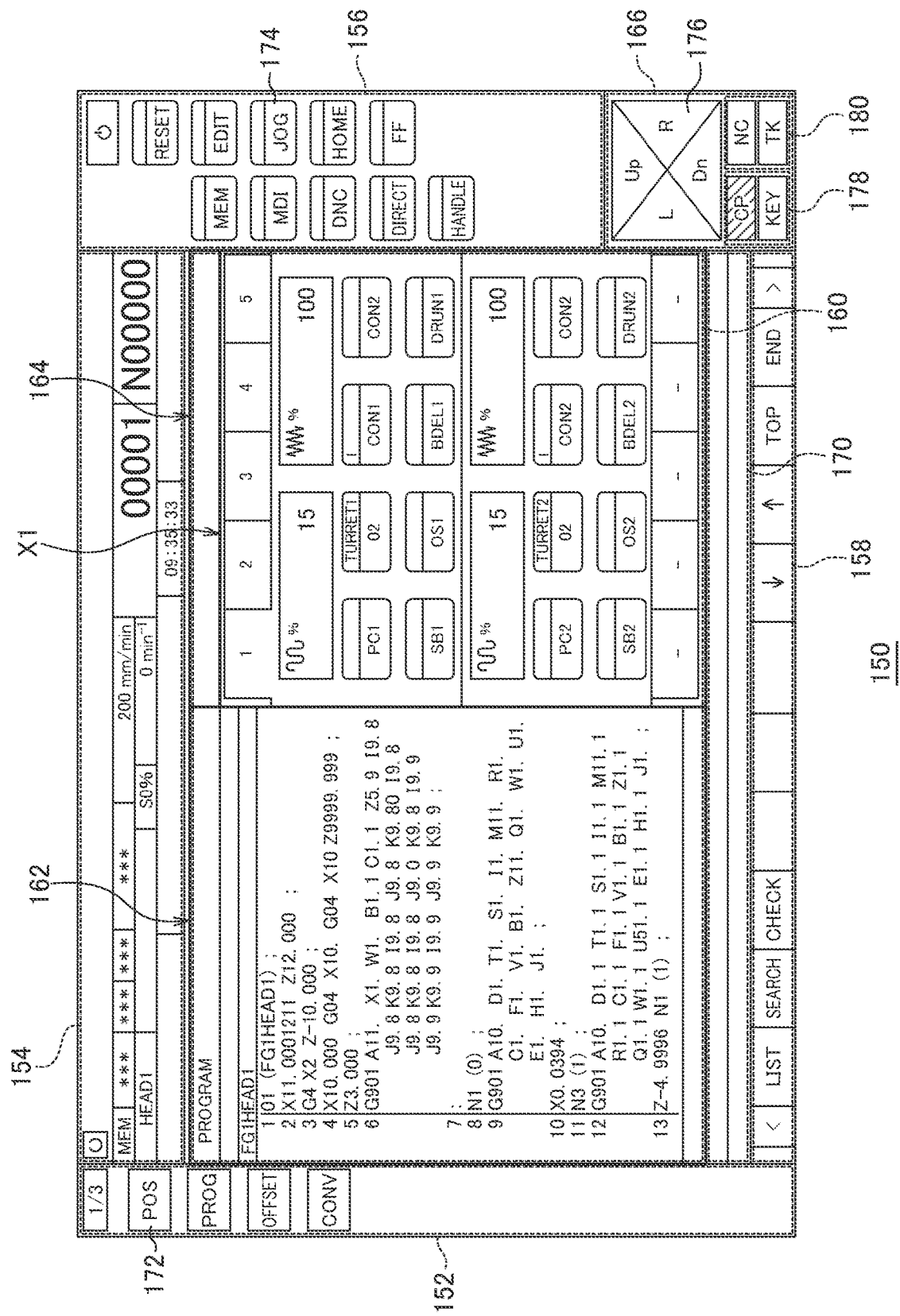
FIG. 6 is a diagram illustrating the operation screen when a memory mode is selected.

FIG. 6 is a diagram illustrating an operation screen 150 when the memory mode is selected.

As described above, the edit mode belongs to the group C, and the memory mode belongs to the group A (see FIG. 3). In the memory mode (group A), the "machine operation panel X1" and "right (R)" are initially set. When a user has changed the mode from the edit mode to the memory mode, the display unit 126 initially displays the machine operation panel X1 in place of the NC keyboard X2 at the right position, that is, on the second area 164. Because the machine operation panel X1 is larger than the NC keyboard X2, the machine operation panel X1, when displayed at the right position, completely covers the second area 164. When the machine operation panel X1 is displayed at the right position as well, the machine operation panel X1 is within the central display area 160, and does not cover the first button selection area 156.

When the mode is changed to the memory mode in a state in which the NC keyboard X2 is displayed in the edit mode, the NC keyboard X2 is deleted, and the machine operation panel X1 is initially displayed at a predetermined position on the right. Alternatively, when the mode is changed to the memory mode in a state in which the machine operation panel X1 is displayed on the upper side in the edit mode, the display position of the machine operation panel X1 is changed from a predetermined position on the upper side to a predetermined position on the right side. Thus, the display unit 126 initially displays the machine operation panel X1 on the right side when the mode is changed to the memory mode regardless of the previous display state.

The machine operation panel X1 includes the user interface for manual control of the mechanisms of the machining equipment 204, and the user interface for intervening in execution of a machining program. Specifically, the machine operation panel X1 includes buttons for executing each line of a machining program, turning coolant delivery on or off, discharging swarf produced during processing, stopping a spindle, executing a machining program without a workpiece, stopping execution of a machining program, and so on.

In the memory mode, the machining equipment 204 is automatically controlled in accordance with a machining program. In the memory mode, the machine operation panel X1 for intervening in control of the machining equipment 204 is often used. When the memory mode is selected, the display unit 126 thus displays the machine operation panel X1 rather than the NC keyboard X2. This saves users the operation of selecting a panel.

[Change from Memory Mode to Edit Mode]

While the memory mode is selected, the operation screen 150 illustrated in FIG. 6 is displayed. In this case, the machine operation panel X1 is initially displayed on the right as described above. When a user has changed the mode from the memory mode to the edit mode, the mode selecting unit 134 initially displays the NC keyboard X2 on the right as illustrated in FIG. 5 rather than the machine operation panel X1.

The edit mode enables modification of machining programs. In the edit mode, the NC keyboard X2 is used more often than the machine operation panel X1. When the edit mode is selected, the display unit 126 thus initially displays the NC keyboard X2. This control method saves users the operation of selecting a panel.

[Change from Jog Mode to MDI Mode]

Figure 7:
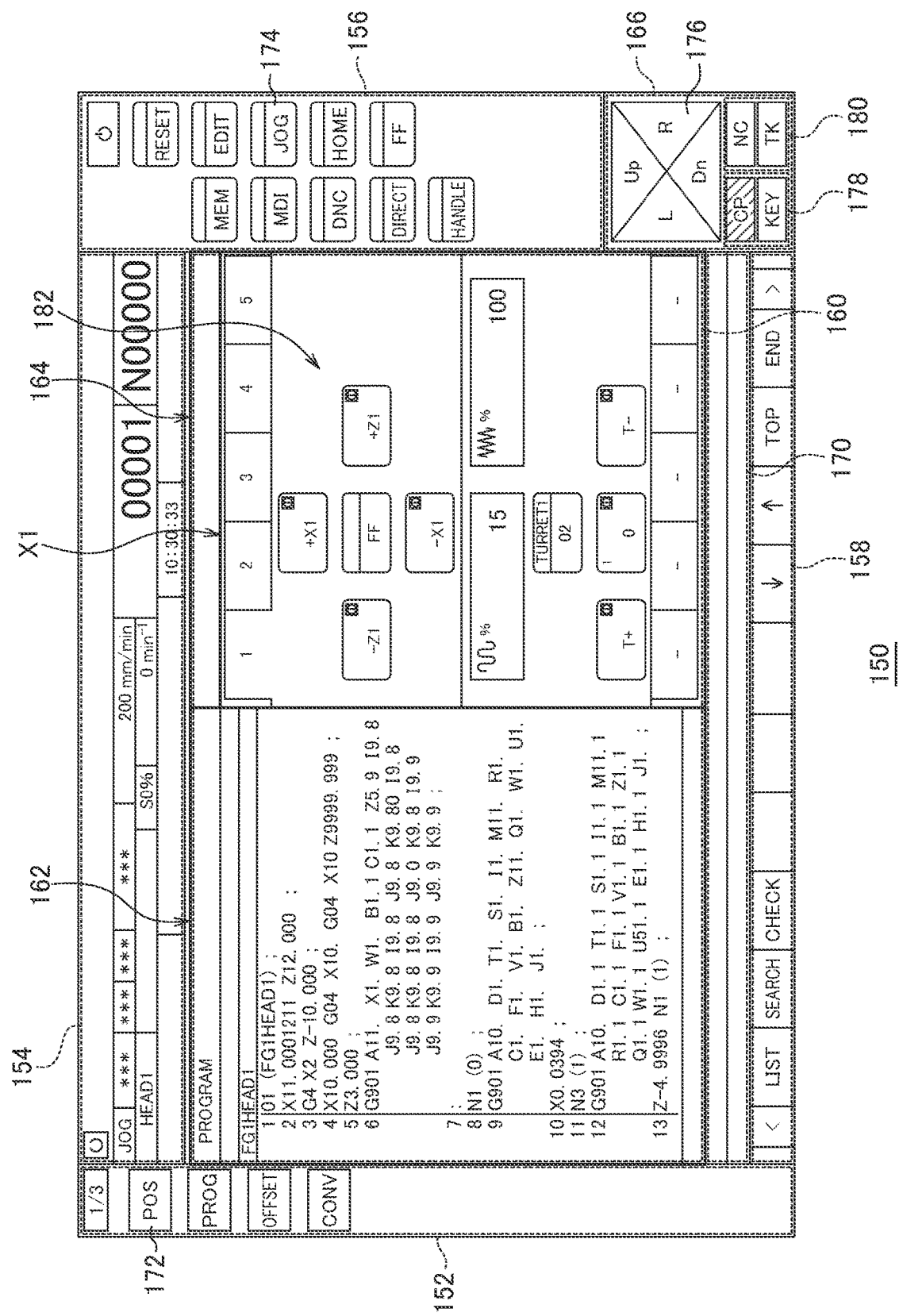
FIG. 7 is a diagram illustrating the operation screen when a jog mode is selected.

FIG. 7 is a diagram illustrating the operation screen 150 when the jog mode is selected.

When the jog mode (group D) is selected, the display unit 126 initially displays the machine operation panel X1 on the right (see FIG. 3). In the jog mode, a spindle of the machining equipment 204 is manually moved with use of the machine operation panel X1. Thus, in the jog mode, display of the machine operation panel X1 is considered as being more appropriate than display of the NC keyboard X2.

Buttons included in the machine operation panel X1 displayed in the jog mode need not be the same as those on the machine operation panel X1 displayed in the memory mode. As illustrated in FIG. 7, the machine operation panel X1 in the jog mode includes spindle movement buttons 182 for moving a spindle in the X direction and in the Z direction. In this manner, a set of buttons included in the machine operation panel X1 may be defined for each mode in advance.

Figure 8:
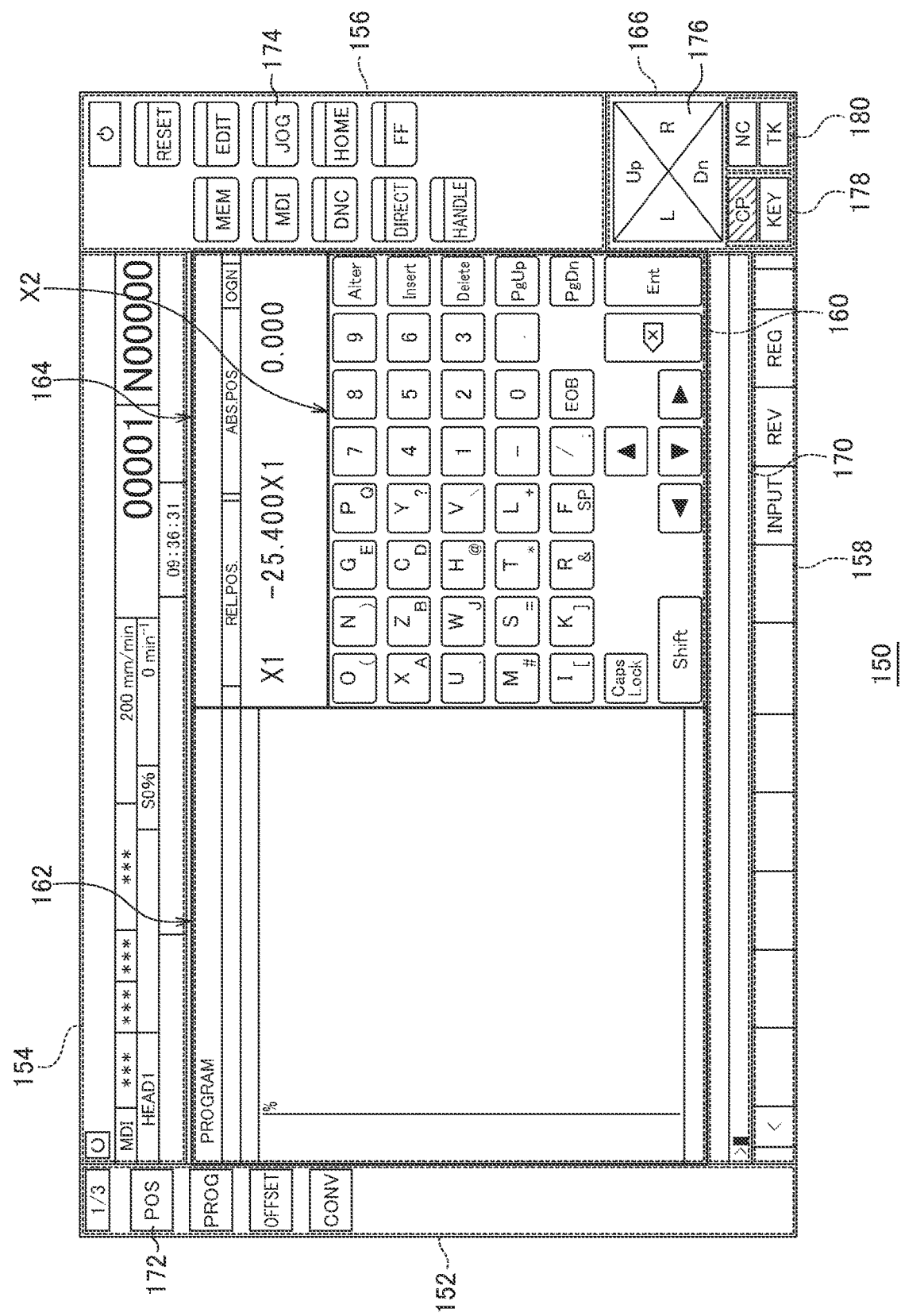
FIG. 8 is a diagram illustrating the operation screen when an MDI mode is selected.

FIG. 8 is a diagram illustrating the operation screen 150 when the MDI mode is selected.

When the MDI mode (group B) is selected, the mode selecting unit 134 initially displays the NC keyboard X2 on the right (see FIG. 3). In the MDI mode, for creating an MDI program (a simple test machining program), the NC keyboard X2 is more often used than the machine operation panel X1. The display unit 126 thus displays the NC keyboard X2 when the MDI mode is selected.

Figure 9:
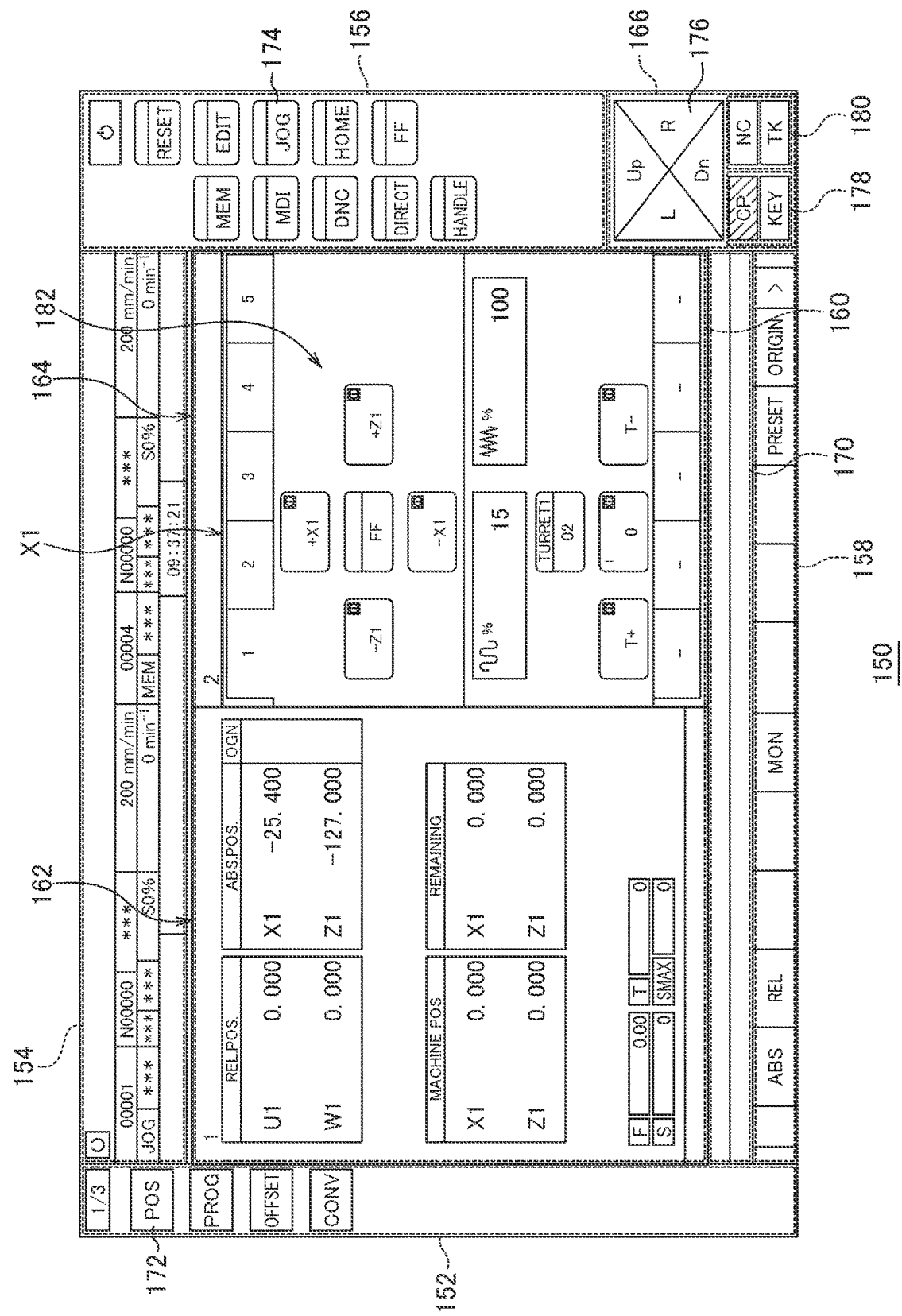
FIG. 9 is a diagram illustrating the operation screen when a position screen is activated in the jog mode.

FIG. 9 is a diagram illustrating the operation screen 150 when the position screen is activated in the jog mode.

In the jog mode, as explained with reference to FIG. 7, the machine operation panel X1 is initially displayed on the right. When a POS button (position) is selected from the second selection button area 152 on the operation screen 150 in FIG. 7, the screen selecting unit 136 activates the position screen. In FIG. 9, the position screen is activated in the first area 162 associated with the first turret, and position coordinates of the spindle of the first turret are thus displayed in the first area 162. In this manner, a user can switch the active screen independently of the mode by using the display selection buttons 172.

Figure 10:
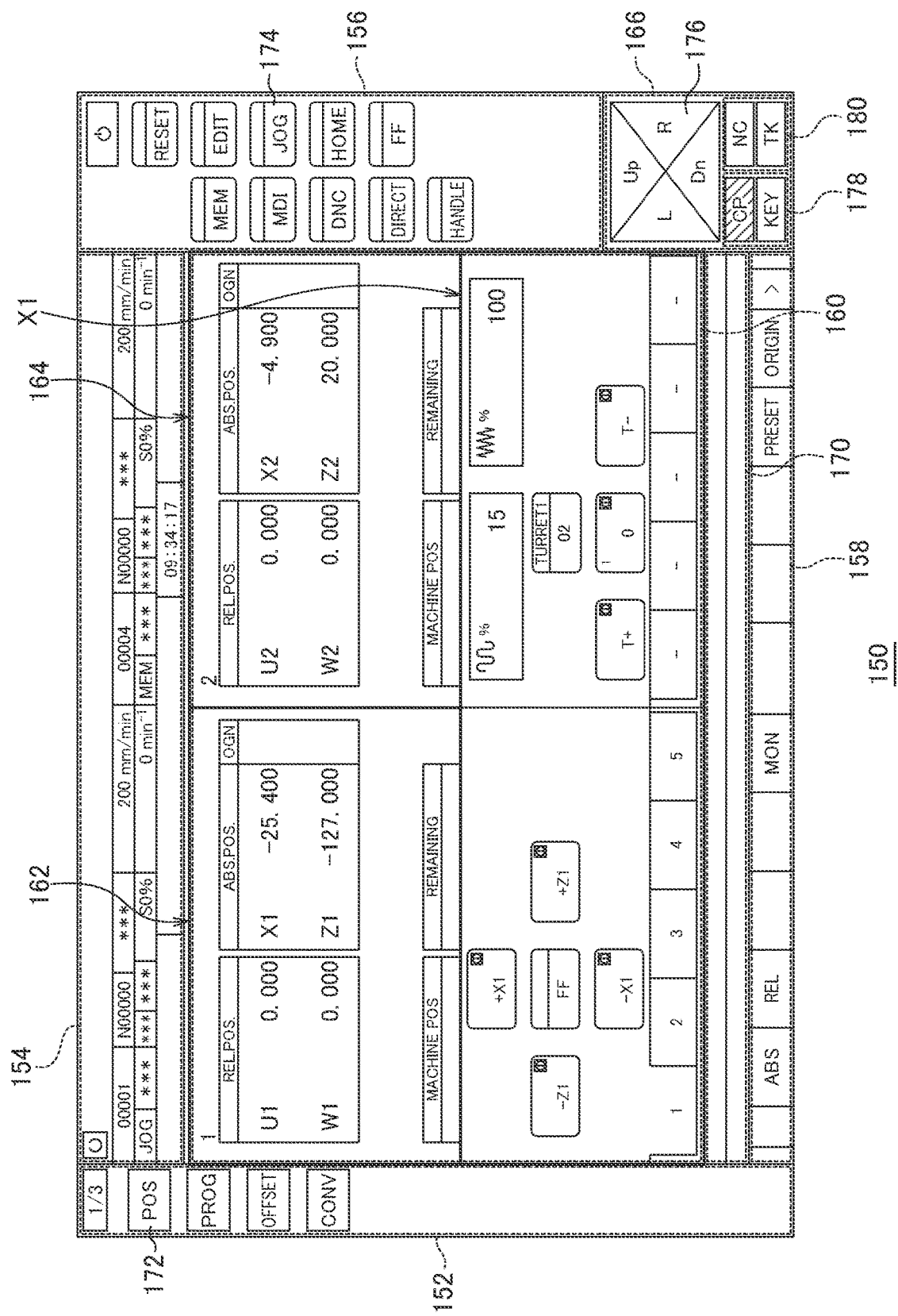
FIG. 10 is a diagram illustrating the operation screen when a machine operation panel is moved down in the jog mode.

FIG. 10 is a diagram illustrating the operation screen 150 when the machine operation panel X1 is moved down in the jog mode.

Assume that a user has selected a down button (Dn) of the panel position buttons 176 in FIG. 9. In this case, the display unit 126 displays the machine operation panel X1 in a lower part of the central display area 160. Two layouts of the machine operation panel X1, which are a portrait-oriented layout to be displayed on the left or right side and a landscape-oriented layout to be displayed on the upper or lower side, are defined in advance. When the down button (Dn) is selected, the display unit 126 displays the machine operation panel X1 in the landscape-oriented layout on the lower side of the central display area 160. Display of the machine operation panel X1 on the lower part facilitates users' recognition of information in both of the first area 162 and the second area 164. The operation screen 150 illustrated in FIG. 10 allows operation of the machine operation panel X1 while checking position coordinates of a spindle of each of the two turrets.

When the machine operation panel X1 is displayed in the lower part, the machine operation panel X1 does not cover the message area 170 and the soft key area 158. When the machine operation panel X1 is displayed in the upper part, the machine operation panel X1 does not cover the state display area 154. When the machine operation panel X1 is displayed on the left side, the machine operation panel X1 does not cover the second selection button area 152. The same applies to the NC keyboard X2.

In addition to the layouts of the machine operation panel X1, the layouts of the NC keyboard X2, which are a landscape-oriented layout to be displayed on the upper or lower side and a portrait-oriented layout to be displayed on the left or right side, are also defined in advance. A user can also change the display position of the NC keyboard X2 by using the panel position buttons 176 while the NC keyboard X2 is displayed.

Figure 11:
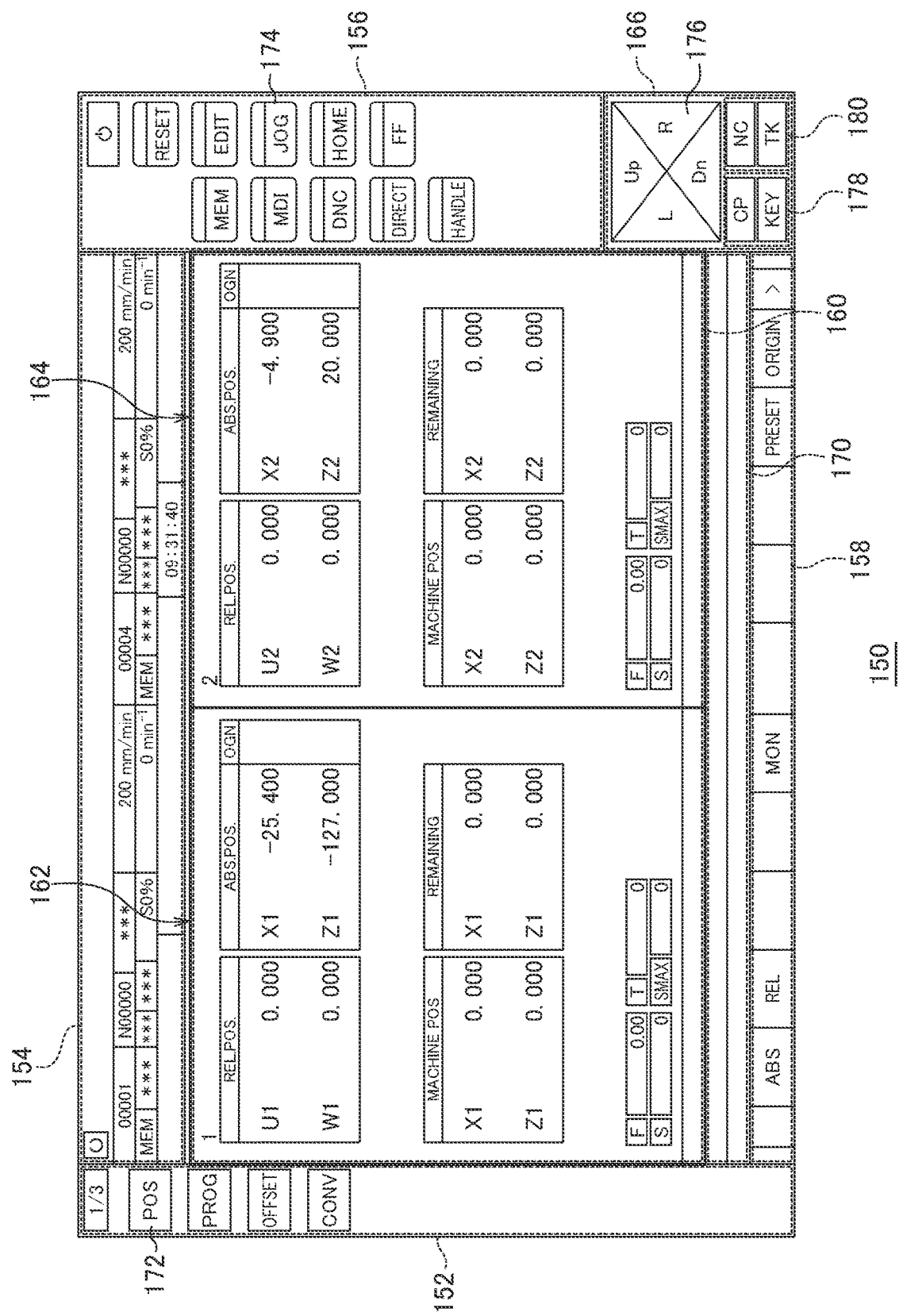
FIG. 11 is a diagram illustrating the operation screen when a handle mode is selected.

FIG. 11 is a diagram illustrating the operation screen 150 when the handle mode is selected.

When the handle mode (group E) is selected, the display unit 126 initially displays neither of the machine operation panel X1 nor the NC keyboard X2 (see FIG. 3). In the handle mode, a user is likely to operate the handle 208 while checking the position coordinates of a spindle. A user is less likely to operate a panel that is a type of a software device while operating the handle 208. Instead, hiding the panels to increase the visibility of the position coordinates of the spindles would be more user-friendly. On such assumption, the panels are not initially displayed when the handle mode is selected, which increases work efficiency.

Figure 12:
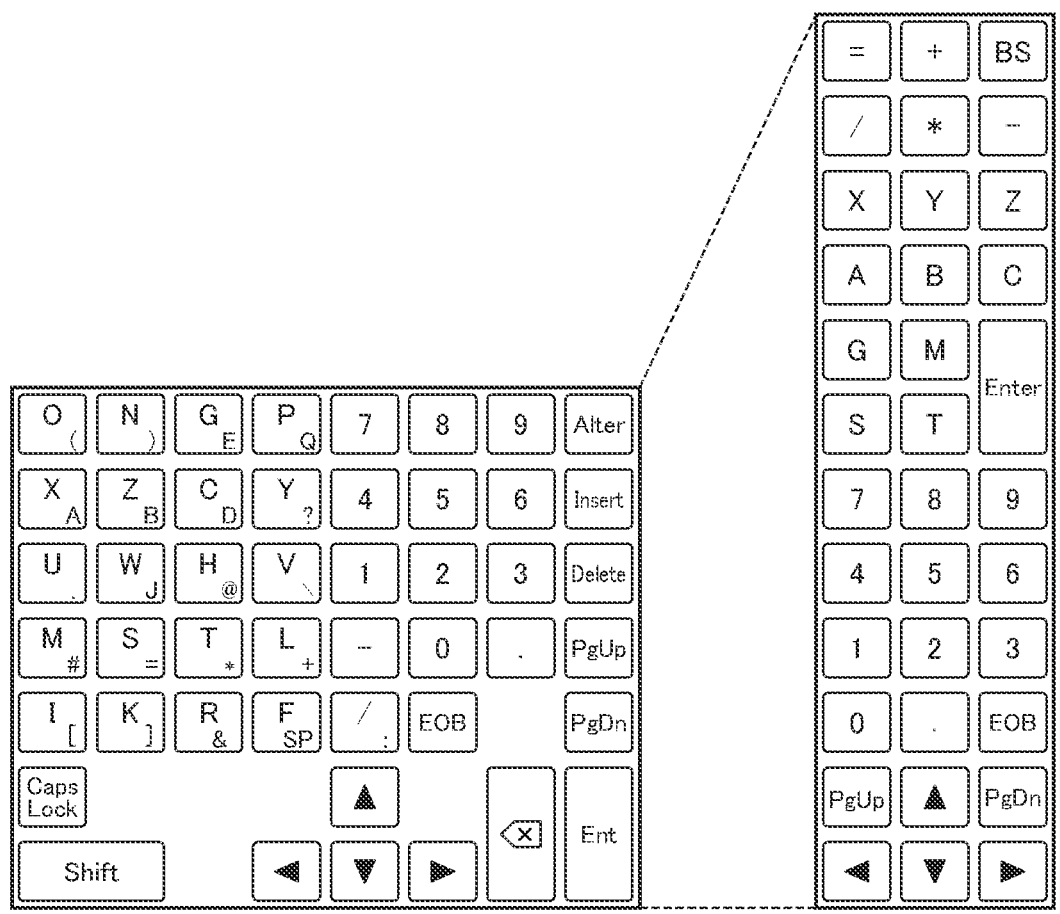
FIG. 12 is a diagram of a screen of an NC keyboard, and a first calculation keyboard for a machining center.

FIG. 12 is a diagram of a screen of the NC keyboard X2, and a first calculation keyboard X2A for a machining center.

When a user has selected a TK button while the NC keyboard X2 of a normal size is displayed, the display unit 126 displays the CAL keyboard in place of the NC keyboard X2. There are two types of CAL keyboards, which are the first calculation keyboard X2A (see FIG. 12), and a second calculation keyboard X2B (see FIG. 13).

As described above, there are two types of panels, which are the machine operation panel X1 and the keyboard. There are two types of keyboards, which are the NC keyboard X2 and the CAL keyboard. Furthermore, there are two types of CAL keyboards, which are the first calculation keyboard X2A and the second calculation keyboard X2B.

When the CAL keyboard is selected as a keyboard to be displayed in the case where the machining equipment 204 to be operated is a machining center, the display unit 126 displays the first calculation keyboard X2A illustrated in FIG. 12. Because the first calculation keyboard X2A is smaller than the NC keyboard X2, display of the first calculation keyboard X2A facilitates users' recognition of information provided in the central display area 160 as compared with display of the NC keyboard X2 of the normal size.

On the first calculation keyboard X2A, the size of key buttons is not reduced, but some character keys (such as a "D" key) are eliminated. The keys that are eliminated from the first calculation keyboard X2A are preferably selected from keys that are less frequently used on the basis of an empirical rule in using a machining center. Elimination of keys that are less frequently used improves the visibility of information in the central display area 160 as compared with display of the NC keyboard X2 while preventing the user-friendliness of the first calculation keyboard X2A from lowering. Because the size of key buttons is not reduced, the easiness of input by the first calculation keyboard X2A is likely to be maintained even when the operation screen 150 is small.

For using a key (such as the "D" key) eliminated from the first calculation keyboard X2A, a user can change the display of the first calculation keyboard X2A to display of the NC keyboard X2 by using an NC button.

Figure 13:
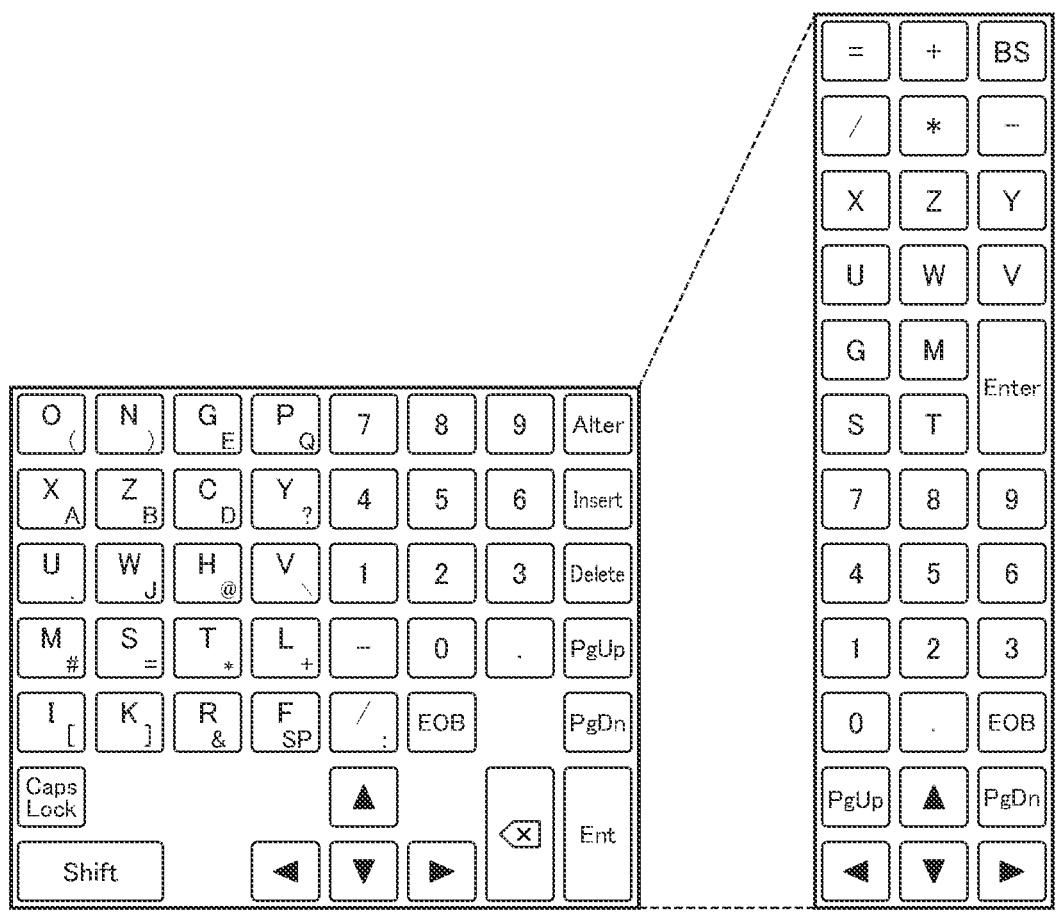
FIG. 13 is a diagram of a screen of the NC keyboard, and a second calculation keyboard for a turning center.

FIG. 13 is a diagram of a screen of the NC keyboard X2, and the second calculation keyboard X2B for a turning center.

In a case where a machine tool 104 is a turning center, the CAL keyboard that is displayed is the second calculation keyboard X2B (FIG. 13) instead of the first calculation keyboard X2A (FIG. 12). The first calculation keyboard X2A (for a machining center) and the second calculation keyboard X2B (for a turning center) have some keys in common, and other keys different from each other. Keys that are frequently used for both of the turning center and the machining center (such as a "G" key, and numeric keys) are registered in both of the first calculation keyboard X2A and the second calculation keyboard X2B. Keys that are less frequently used for both of the turning center and the machining center (such as a "D" key) are eliminated from both of the first calculation keyboard X2A and the second calculation keyboard X2B.

A "U" key is registered in the second calculation keyboard X2B (for a turning center), but is eliminated from the first calculation keyboard X2A (for a machining center). This is because the "U" key is frequently used for a turning center but is less frequently used for a machining center. In this manner, keys to be registered in and keys to be eliminated from the first calculation keyboard X2A and the second calculation keyboard X2B are different depending on the type of the machine tool 104.

Furthermore, "X", "Y", and "Z" keys on the first calculation keyboard X2A are arranged in this order, but those on the second calculation keyboard X2B are arranged in the order of "X", "Z", and "Y". This is because coordinates are frequently entered in the order of an X coordinate, a Y coordinate, and a Z coordinate for a machining center (the first calculation keyboard X2A), whereas coordinates are frequently entered in the order of an X coordinate, a Z coordinate, and a Y coordinate for a turning center (the second calculation keyboard X2B). In this manner, the layout of keys varies depending on the type of the machine tool 104.

The machine tool 200 and, in particular, the display control device 100 have been described above with reference to an embodiment.

According to the present embodiment, in the case where the display control device 100 provides a plurality of modes, a frequently-used panel can be initially displayed every time a user selects a mode. This reduces the frequency of occurrence of an additional operation of selecting a panel after the mode is changed. In particular, in a case of mass production of one workpiece, how much time of users' operation on the console 206 can be reduced and how many operations on the operation screen 150 can be reduced significantly affect the productivity and sales. Reduction in the frequency of panel operations is likely to directly improve the productivity and work efficiency.

In addition to the types of the displayed panels, the positions of the panels can be changed, which achieves both of the visibility of the operation screen 150 and the user-friendliness of the panels. Furthermore, the display area of panels on the operation screen 150 is limited to the central display area 160, so as not to hinder the user-friendliness of the second selection button area 152, the first button selection area 156, etc. and the visibility of the state display area 154, etc.

The present invention is not limited to the embodiment described above and modifications thereof, and any component thereof can be modified and embodied without departing from the scope of the invention. Components described in the embodiment and modifications can be combined as appropriate to form various embodiments. Some components may be omitted from the components presented in the embodiment and modification.

[Modifications]

For an initial display pattern, various manners of display such as the sizes (areas) and the shapes (aspect ratio) of the panels, and the types and colors of the buttons may also be defined in addition to the types and the positions of the panels.

The panel setting information 140 may define an active screen to be initially displayed in each mode or group. For example, a "program screen" may be associated as an active screen with the MDI mode (group B). When the MDI mode is selected, the display unit 126 initially displays the "program screen" as an active screen in accordance with the panel setting information 140. In the MDI mode, for creating a simple machining program on the spot, the "program screen" is often selected as an active screen. Thus, when the MDI mode selected, the "program screen" is selected as an active screen, so that the number of operations on the display selection buttons 172 is reduced.

What is claimed is:

1. A display control device comprising:
a display unit to display a machine operation panel and a keyboard on an operation screen of a machine operation panel; and
a setting unit to set a mode selected by a user from a plurality of modes of the machine tool, wherein
the modes include at least a machining mode for operating the machine tool to process a workpiece, and a manual data input (MDI) mode,
when the mode is changed, the display unit displays a machine operation panel or a keyboard associated with the mode after the change on the operation screen,
the modes are classified into a plurality of groups,
the groups are each associated with a machine operation panel or a keyboard to be displayed,
when the mode is changed, the display unit displays a machine operation panel or a keyboard associated with a group to which the mode after the change belongs,
a first group including the machining mode is associated with a machine operation panel, as a panel to be displayed, including an input interface for transmitting predetermined control instructions to mechanisms of the machine tool, and
a second group including a mode for creating or modifying a machining program is associated with a keyboard, as a keyboard to be displayed, including an input interface for inputting either or both of characters and numbers.

2. The display control device according to claim 1, wherein
the modes further include a handle mode for operating a spindle of the machine tool with a handle, and
when the handle mode is set, the display unit displays position coordinates of the spindle as information associated with the handle mode on the operation screen, and hides both of the machine operation panel and the keyboard.

3. The display control device according to claim 1, wherein
when the mode is changed, the display unit displays the machine operation panel or the keyboard associated with the mode after the change further at a position and/or with a size associated with the mode after the change.

4. The display control device according to claim 1, wherein
a list of selection buttons associated with the respective modes is displayed in a first selection button area, the first selection button area being part of the operation screen, and
when the mode is changed, the display unit displays a machine operation panel or a keyboard at such a position that does not overlap with the first selection button area.

5. The display control device according to claim 1, wherein
the display unit displays an information area specified by a user on the operation screen from a plurality of information areas of the machine tool and, when the mode is changed, further displays information area associated with the mode after the change.

6. The display control device according to claim 5, wherein
a list of selection buttons associated with the respective information areas is displayed in a second selection button area, the second selection button area being part of the operation screen, and
when the mode is changed, the display unit displays a machine operation panel or a keyboard at such a position that does not overlap with the second selection button area.

7. A display control device comprising:
a display unit to display a machine operation panel and a keyboard on an operation screen of a machine operation panel; and
a setting unit to set a mode selected by a user from a plurality of modes of the machine tool, wherein
when a first mode of the modes is selected, the display unit displays first information associated with the first mode on the operation screen, when a second mode of the modes is selected, the display unit displays second information associated with the second mode on the operation screen, and when the first mode is selected while the second information in the second mode is displayed, the display unit displays the first information in such a manner that the display unit displays a machine operation panel or a keyboard associated with the first mode after the change on the operation screen on a condition that a group to which the first mode belongs and a group to which the second mode belongs are different from each other,
the modes are classified into a plurality of groups,
the groups are each associated with a machine operation panel or a keyboard to be displayed,
when the mode is changed, the display unit displays a machine operation panel or a keyboard associated with a group to which the mode after the change belongs,
a first group including a machining mode is associated with a machine operation panel, as a panel to be displayed, including an input interface for transmitting predetermined control instructions to mechanisms of the machine tool, and
a second group including a mode for creating or modifying a machining program is associated with a keyboard, as a keyboard to be displayed, including an input interface for inputting either or both of characters and numbers.

* * * * *